(12) United States Patent
Tomiyama et al.

(10) Patent No.: US 9,676,284 B2
(45) Date of Patent: Jun. 13, 2017

(54) CHARGING CONNECTOR

(71) Applicant: PANASONIC INTELLECTUAL PROPERTY MANAGEMENT CO., LTD., Osaka (JP)

(72) Inventors: Ryota Tomiyama, Aichi (JP); Maki Kondou, Osaka (JP); Hideki Oka, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/303,465

(22) PCT Filed: Feb. 24, 2015

(86) PCT No.: PCT/JP2015/000893
§ 371 (c)(1),
(2) Date: Oct. 11, 2016

(87) PCT Pub. No.: WO2015/159471
PCT Pub. Date: Oct. 22, 2015

(65) Prior Publication Data
US 2017/0036556 A1    Feb. 9, 2017

(30) Foreign Application Priority Data

Apr. 14, 2014    (JP) ................. 2014-082979

(51) Int. Cl.
*B60L 11/18*     (2006.01)
*H01R 13/56*     (2006.01)
(Continued)

(52) U.S. Cl.
CPC ........ *B60L 11/1818* (2013.01); *H01R 13/405* (2013.01); *H01R 13/56* (2013.01);
(Continued)

(58) Field of Classification Search
CPC ...... B60L 11/1818; B60L 11/18; H01R 4/023; H01R 4/72; H01R 7/0045; H01R 13/52;
(Continued)

(56) References Cited

U.S. PATENT DOCUMENTS 7,364,478 B2 *   4/2008   Xu .......................... H01R 4/187
                                                    439/730
7,413,488 B2 *   8/2008   Matsumura .......... H01H 85/044
                                                    439/874
(Continued)

FOREIGN PATENT DOCUMENTS

CN    103718387 A    4/2014
JP    2003-045556 A  2/2003
(Continued)

OTHER PUBLICATIONS

Office Action issued in corresponding Taiwanese Patent Application No. 104106587, mailed on May 17, 2016.
(Continued)

*Primary Examiner* — Tulsidas C Patel
*Assistant Examiner* — Travis Chambers
(74) *Attorney, Agent, or Firm* — McDermott Will & Emery LLP (57) ABSTRACT

The first molded part and the second molded part are molded products of synthetic resin materials. The first molded part is made of a synthetic resin material having a higher creep resistance than a synthetic resin material forming the second molded part. The second molded part is made of a synthetic resin material higher than a synthetic resin material forming the first molded part in adhesion to a material forming the receiver contact.

2 Claims, 7 Drawing Sheets

(51) Int. Cl.
 H01R 13/58 (2006.01)
 H01R 13/405 (2006.01)
 H02J 7/00 (2006.01)
 H01R 13/52 (2006.01)
(52) U.S. Cl.
 CPC ............ H01R 13/58 (2013.01); H02J 7/0045 (2013.01); *B60L 11/18* (2013.01); *H01R 13/52* (2013.01); *Y02T 10/7005* (2013.01); *Y02T 90/121* (2013.01)
(58) Field of Classification Search
 CPC ...... H01R 13/56; H01R 13/58; H01R 13/405; H01R 13/5845; H01R 23/661; Y02T 10/7005; Y02T 90/121
 USPC ........ 439/736, 430, 449, 452, 474, 730, 874
 See application file for complete search history.

(56) References Cited

U.S. PATENT DOCUMENTS

| | | | |
|---|---|---|---|
| 8,016,604 B2 * | 9/2011 | Matsumoto | B60L 3/0069 439/304 |
| 8,206,184 B2 * | 6/2012 | Kwasny | B60L 11/1818 439/474 |
| 9,293,838 B2 * | 3/2016 | Sakaguchi | H01R 4/62 |
| 2011/0207368 A1 | 8/2011 | Takada et al. | |
| 2011/0212645 A1 | 9/2011 | Osawa et al. | |
| 2011/0223792 A1 | 9/2011 | Osawa et al. | |
| 2013/0231013 A1 * | 9/2013 | Sato | H01R 4/185 439/878 |
| 2014/0227909 A1 | 8/2014 | Kojima et al. | |
| 2016/0209277 A1 * | 7/2016 | Motooka | G01K 1/08 |

FOREIGN PATENT DOCUMENTS

| | | |
|---|---|---|
| JP | 2011-171166 A | 9/2011 |
| TW | 201330410 A1 | 7/2013 |
| WO | 2013/061120 A1 | 5/2013 |

OTHER PUBLICATIONS

International Search Report and Written Opinion issued in International Patent Application No. PCT/JP2015/000893, mailed on Apr. 28, 2015; with partial English translation.

\* cited by examiner

FIG. 7

CHARGING CONNECTOR

RELATED APPLICATIONS

This application is the U.S. National Phase under 35 U.S.C. §371 of International Patent Application No. PCT/JP2015/000893, filed on Feb. 24, 2015, which in turn claims the benefit of Japanese Application No. 2014-082979, filed on Apr. 14, 2014, the disclosures of which Applications are incorporated by reference herein.

TECHNICAL FIELD

The present invention generally relates to charging connectors, and particularly relates to a charging connector for charging electric vehicles.

BACKGROUND ART

Document 1 (JP 2011-171166 A) discloses a charging connector of a conventional example. This charging connector has a pistol (handgun) shape as a whole, and includes a connector body constituting an almost front half part, and a grip extending orthogonally downward from a rear part of the connector body. The connector body and the grip are formed integrally as a synthetic resin molded product. There is a hood part with a hollow cylindrical shape protruding from a front face of the connector body. Further, there is a lever accommodated in an upper part of the connector body. This lever includes a latch (craw) at its end with the lever being exposed outside on a front edge of an upper face of the connector body. Additionally, there is a plurality of terminal accommodating parts with hollow cylindrical shapes inside the hood part, and each terminal accommodating part accommodates a power supply terminal (female contact).

On the other hand, the electric vehicle is equipped with a vehicular connector (charging inlet) into which the charging connector is to be removably plugged. The vehicular connector includes a vehicular housing allowed to be engaged with the charging connector. The vehicular housing is of synthetic resin and includes a housing body allowed to be engaged in the hood part. There is a plurality of power supply terminals (male contact) inside the housing body. Note that, there is a seal ring provided between the power supply terminal and an inner wall of the terminal accommodating part for the purpose of waterproof.

There is an engaging hollow cylinder provided to an outer periphery of the housing body, and the hood part is allowed to be engaged between the housing body and the engaging hollow cylinder. There is a lock protrusion provided on an upper face of the engaging hollow cylinder. This lock protrusion is allowed to be engaged with the latch provided at the end of the lever.

When the housing body is fitted into the hood part, the male contact inside the housing body is connected to the female contact inside the hood part. Additionally, when the charging connector is engaged with the charging inlet, the latch is engaged with the lock protrusion, and thereby the charging connector and the charging inlet are kept in engagement with each other.

In the conventional example disclosed in Document 1, the power supply terminal of the charging connector is accommodated in the terminal accommodating unit of the charging connector without covered with anything. Hence, when the charging connector is plugged into or pulled out from the charging inlet, excessive stress is likely to occur at a junction between the power supply terminal and a conductor of an electric wire. Such excessive stress may repeatedly occur at the junction, and this may lead to a decrease in long-term reliability of the charging connector.

SUMMARY OF INVENTION

In view of the above insufficiency, an object of the present invention would be to suppress a decrease in long-term reliability of a charging connector.

The charging connector of one aspect according to the present invention includes: a plurality of terminal parts; a main body; and a cover. Each of the plurality of terminal parts includes: a receiver contact to be electrically connected to a conductor of a charging cable; a first molded part for covering a junction between the receiver contact and the conductor; a sealing member with a ring shape for circumferentially surrounding an outer peripheral surface of the first molded part; and a second molded part for covering a border between the receiver contact and the first molded part. The cover includes: a plurality of holding parts individually holding the plurality of terminal parts; and a surrounding wall part surrounding the receiver contacts individually protruding from the plurality of holding parts. The main body includes: an accommodating part accommodating the plurality of holding parts; and a grip for accommodating an end part of the charging cable. Each first molded part and each second molded part are a molded product of a first synthetic resin material and a molded product of a second synthetic resin material, respectively. The first synthetic resin material forming each first molded part is a synthetic resin material having a higher creep resistance than the second synthetic resin material forming each second molded part. The second synthetic resin material forming each second molded part is a synthetic resin material higher than the first synthetic resin material forming each first molded part in adhesion to material forming each receiver contact.

The above charging connector can offer advantageous effects of suppressing a decrease in long-term reliability.

DESCRIPTION OF EMBODIMENTS

Figure 1:
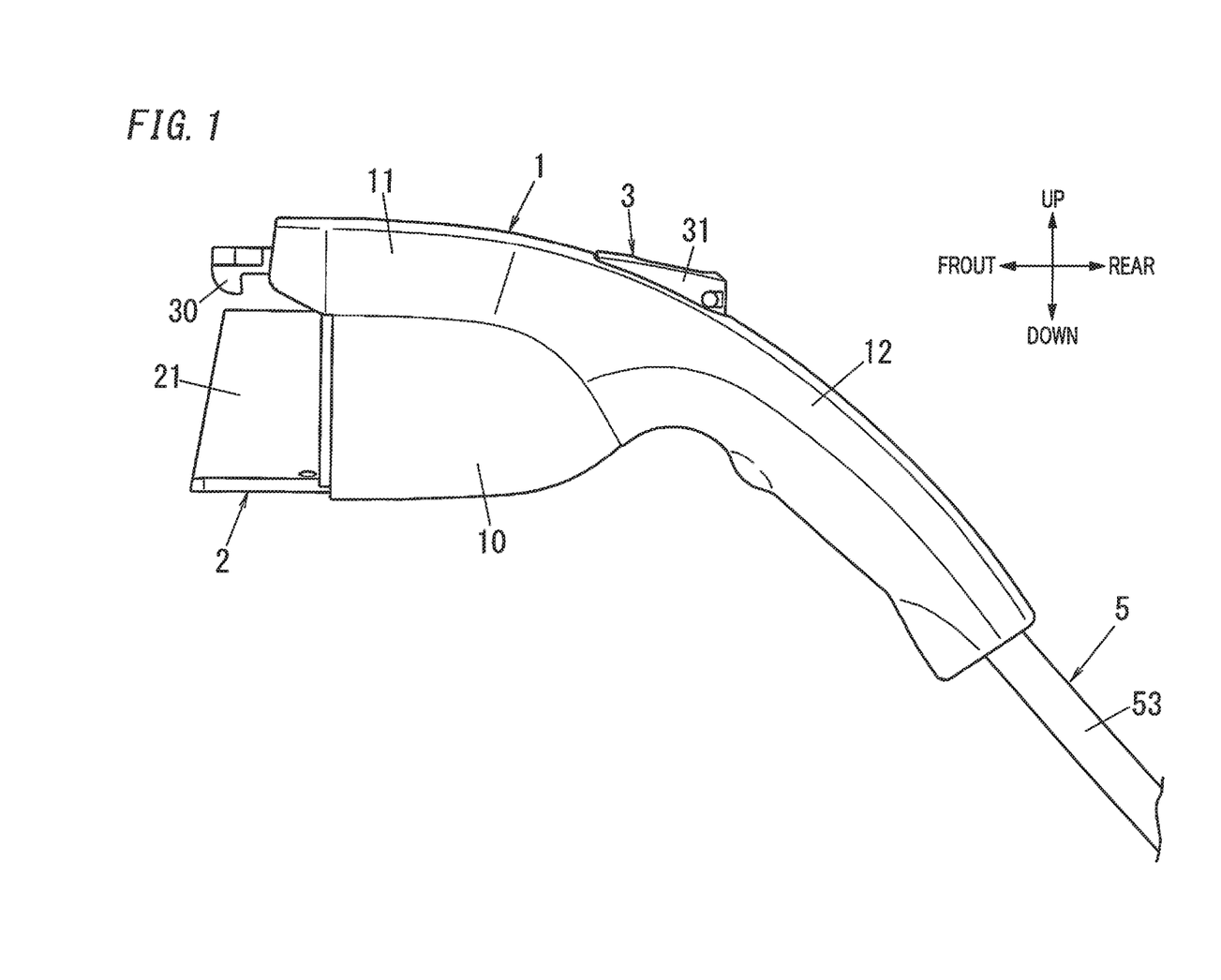
FIG. 1 is a side view of a charging connector of the present embodiment.
Figure 2:
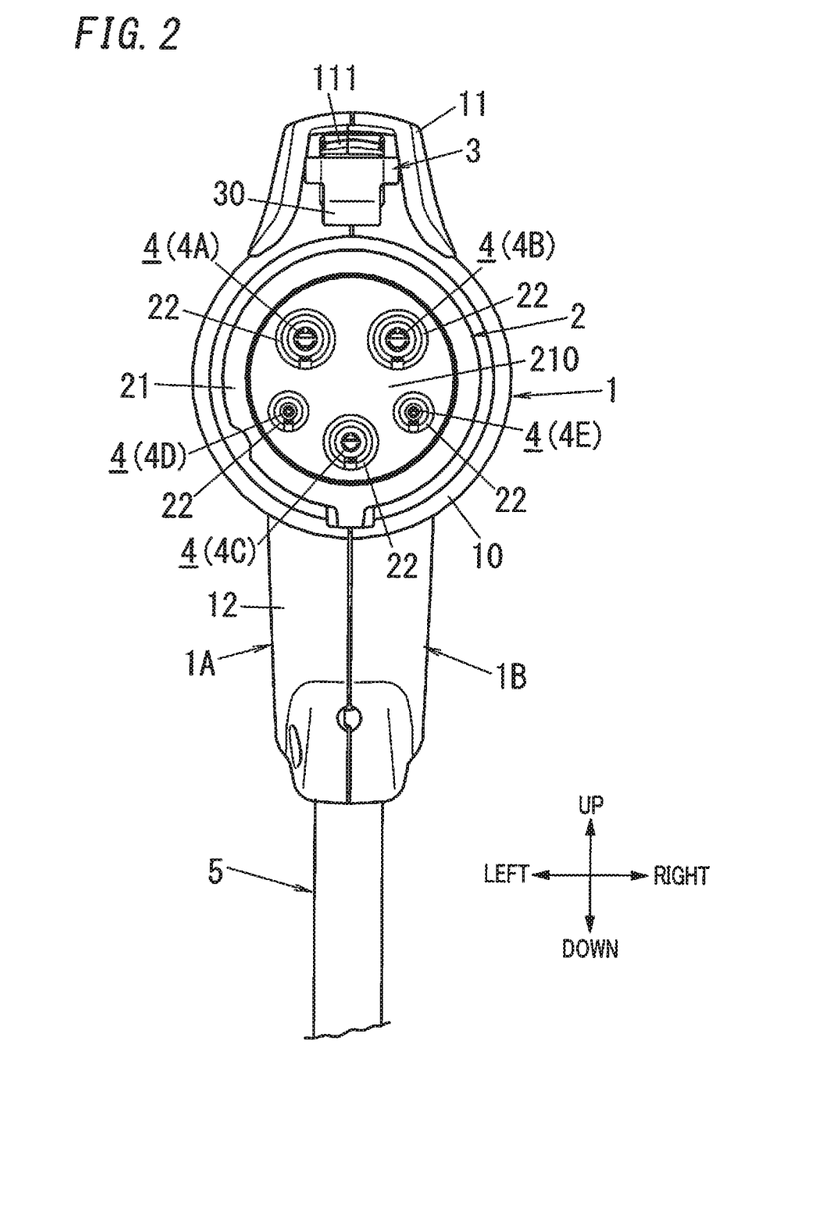
FIG. 2 is a front view of the charging connector of the present embodiment.
Figure 3:
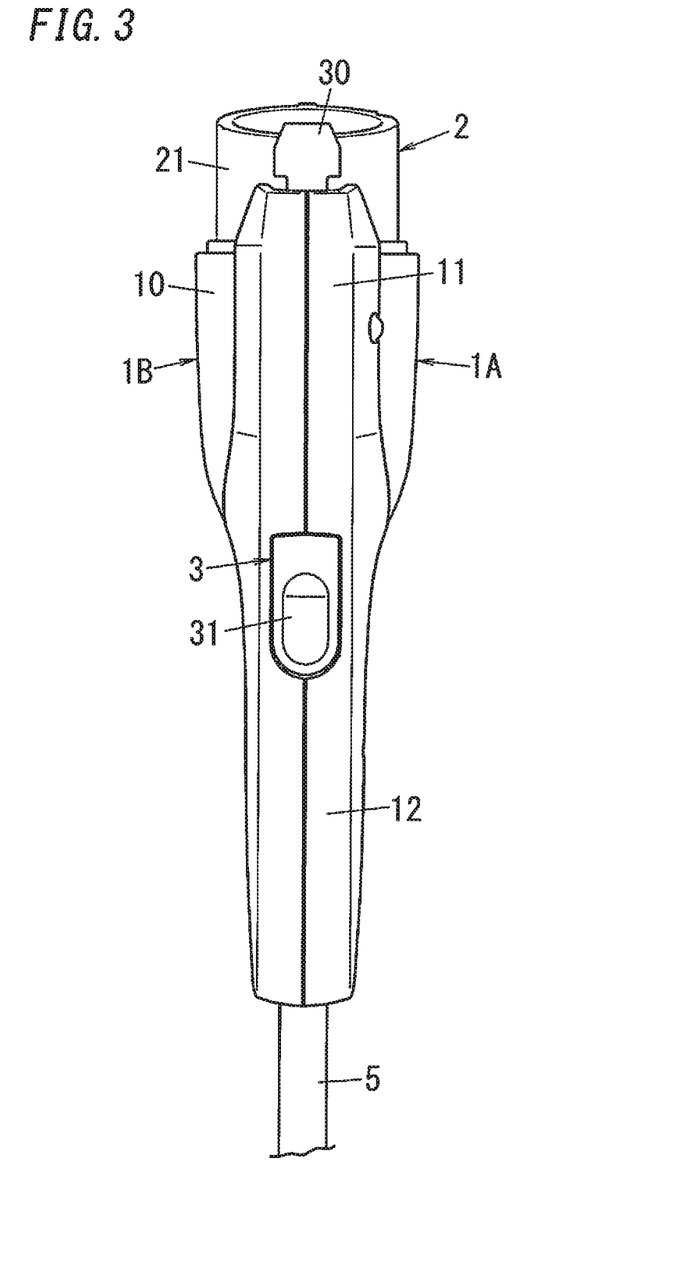
FIG. 3 is a top view of the charging connector of the present embodiment.
Figure 4:
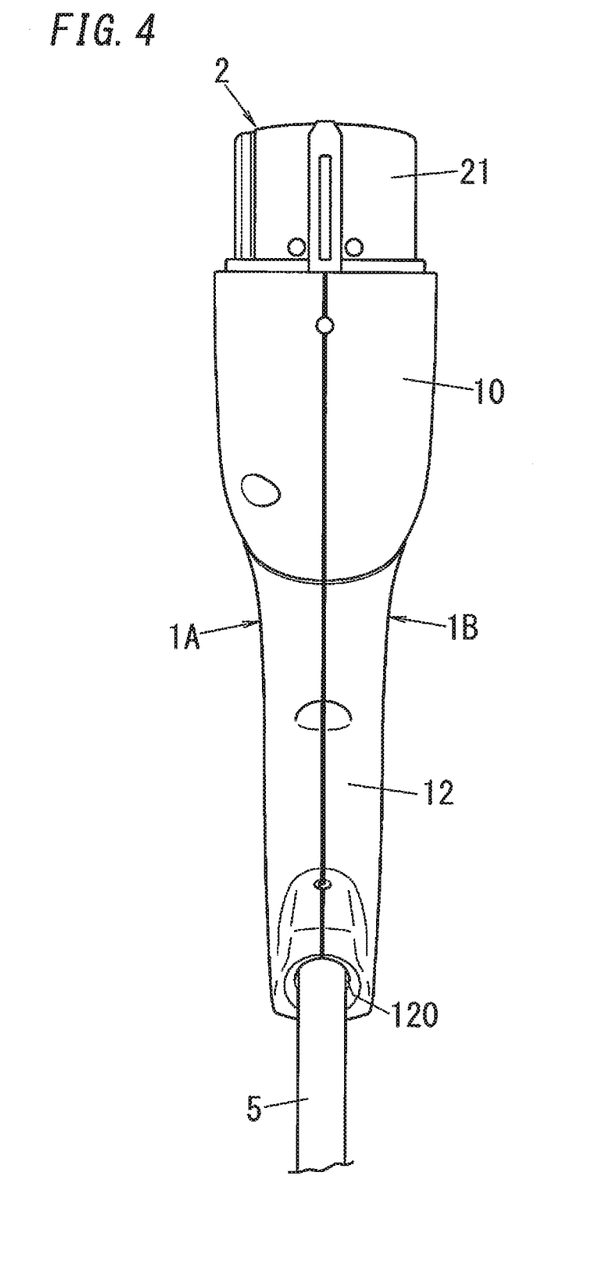
FIG. 4 is a bottom view of the charging connector of the present embodiment.

Hereinafter, a charging connector of the present embodiment is described in detail with reference to FIG. 1 to FIG. 7. Note that, in the following description, forward, rearward, left, right, upward and downward directions of the charging connector are defined as shown in FIG. 1 and FIG. 2. Specifically, a lengthwise direction of a main body 1 of the charging connector is defined as a forward and rearward direction, and in the forward and rearward direction, a direction from a center of the main body 1 toward a latch 30 is defined as a front direction, and a direction from the center of the main body 1 toward a lever 3 is defined as a rearward direction. Additionally, a width direction of the main body 1 of the charging connector is defined as an upward and downward direction, and in the upward and downward direction, a direction from the center of the main body 1 toward the latch 30 is defined as an upward direction, and a direction from the center of the main body 1 toward a cover 2 is defined as a downward direction. Further, when viewing the charging connector from its front side, a direction from the center of the main body 1 toward a first half body 1A is defined as a left direction, and a direction from the center of the main body 1 toward a second main half 1B is defined as a right direction.

Figure 5:
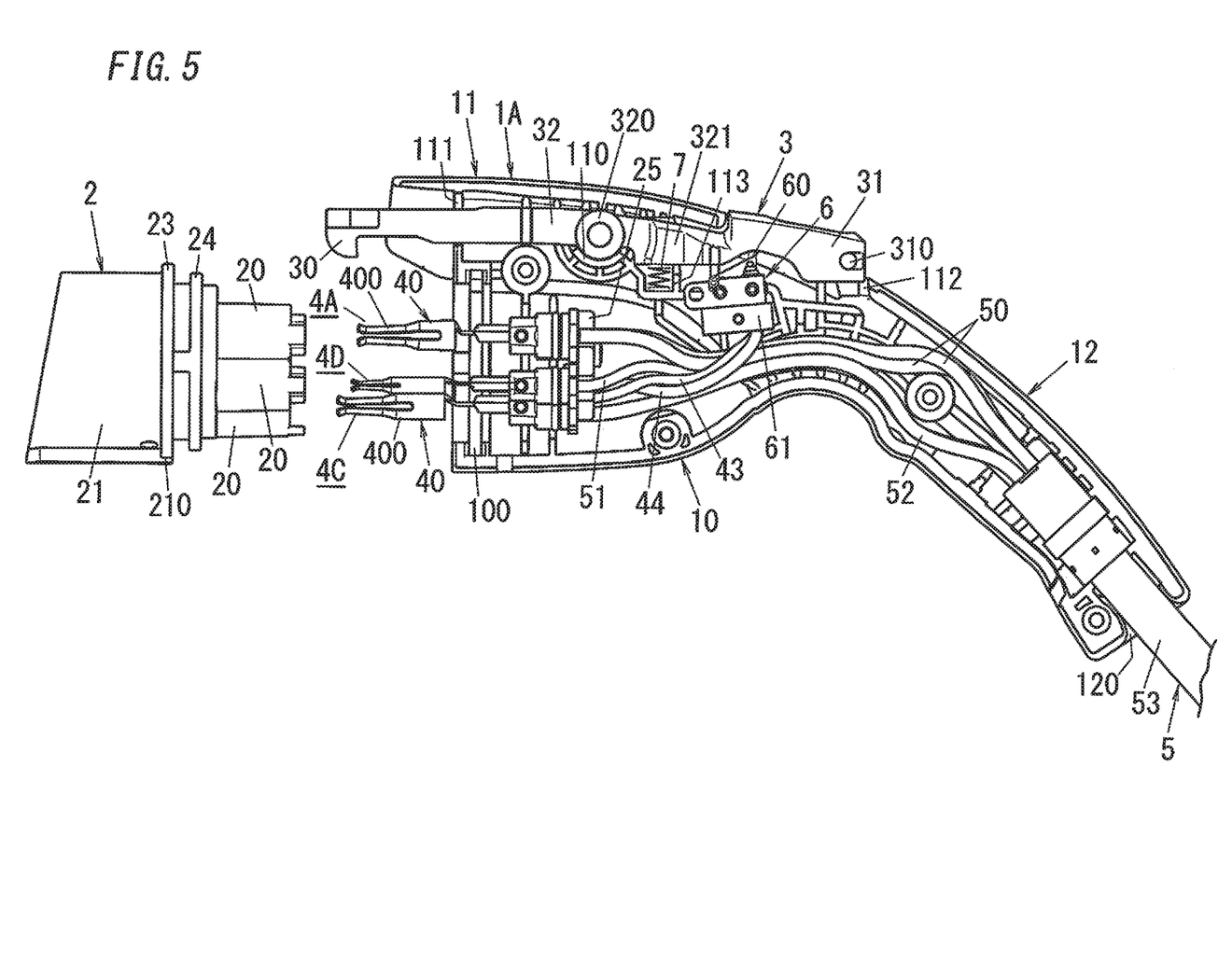
FIG. 5 is a partial exploded view of the charging connector of the present embodiment.

The charging connector of the present embodiment includes the main body 1, the cover 2, the lever 3, and terminal parts 4 (see FIG. 6 and FIG. 7), for example, and may be provided at an end of a charging cable 5. The charging cable 5 includes, as shown in FIG. 5, two power supply wires 50, one signal wire 51, one grounding wire 52, and a sheath 53, and is electrically connected to charging facilities. The charging facilities are configured to supply an AC voltage and an AC current of single phase 200 V, through the power supply wires 50. Further, the charging facilities are configured to send communication signals (e.g., so-called CPLT (control pilot) signals) to and receive them from electric vehicles (including hybrid electric vehicles, and this term is used in the same meaning in the following description) to be fed, through the signal wire 51 (and the grounding wire 52). Note that, such charging facilities are well-known, and therefore detail configuration thereof is not illustrated and described.

The main body 1 includes a first accommodation part 10, a second accommodation part 11, and a grip 12 (see FIG. 1). Additionally, the main body 1 is formed by connecting a first half body 1A and a second half body 1B with screws (see FIG. 2). The first half body 1A is a synthetic resin molded product and likewise the second half body 1B is a synthetic resin molded product. Note that, when viewed from the front side, the first half body 1A and the second half body 1B are mirror images of one another.

The first accommodation part 10 is formed in a cannon-shell shape with an open bottom. The second accommodation part 11 is formed in a hollow rectangular prism shape, and is connected to an upper surface of the first accommodation part 10. The grip 12 is formed in a hollow rectangular prism shape and is connected to rear ends of the first accommodation part 10 and the second accommodation part 11.

The cover 2 includes a plurality (five in the present embodiment) of holding parts 20 and one surrounding wall part 21 which are integrally formed as a synthetic resin molded product (see FIG. 5). Note that, FIG. 5 illustrates three holding parts 20 of the five holding parts 20. The surrounding wall part 21 is formed in a hollow cylindrical shape with an open front end and a bottom. The holding parts 20 each are formed in a hollow cylindrical shape, and protrude rearward from a bottom wall 210 of the surrounding wall part 21 (see FIG. 5 and FIG. 6). Further, there are five protective walls 22 provided inside the surrounding wall part 21 so as to protrude forward from the bottom wall 210 (see FIG. 2). These protective walls 22 have internal spaces connected to internal spaces of the holding parts 20 across the bottom wall 210 (see FIG. 6).

Further, there are two flanges 23 and 24 with circular ring shapes provided to an outer peripheral surface of the cover 2 so as to be arranged in the forward and rearward direction (see FIG. 5). The front flange (first flange) 23 is formed integrally with the bottom wall 210. Further, the rear flange (second flange) 24 is provided to surround the five holding parts 20 collectively (see FIG. 6).

Figure 7:
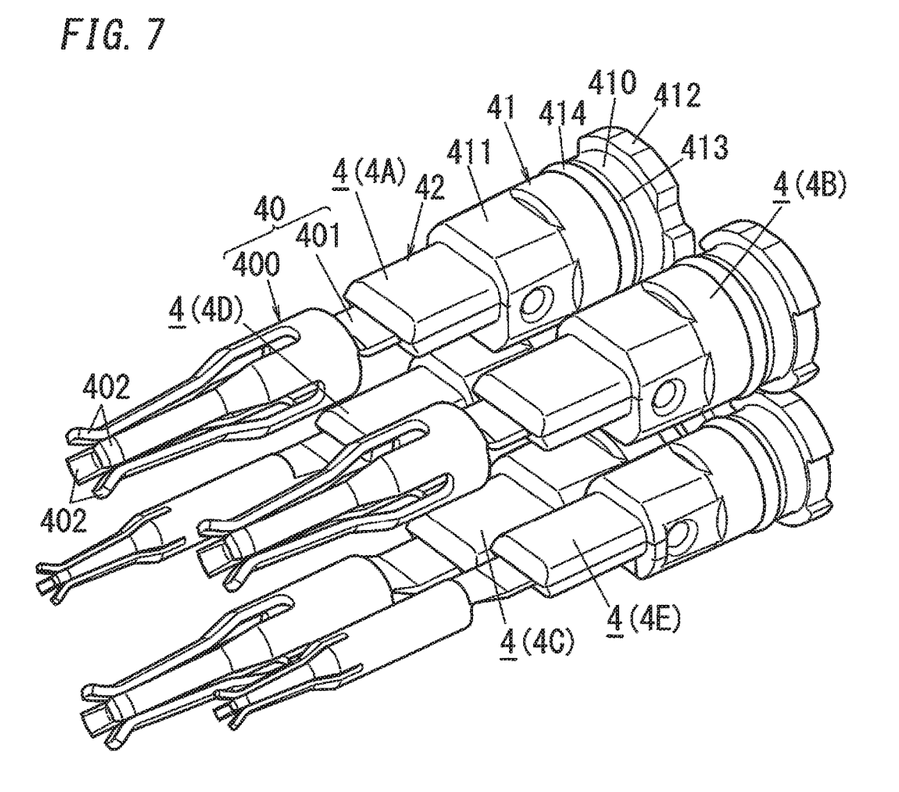
FIG. 7 is a perspective view of terminal parts of the charging connector of the present embodiment.

The terminal parts 4 are classified into two terminal parts 4A and 4B for power supply, one terminal part 4C for grounding, and two terminal parts 4D and 4E for signal transmission (see FIG. 2 and FIG. 7). Note that, the two terminal parts 4A and 4B for power supply and the single terminal part 4C for grounding have the same shape and dimensions. Additionally, the two terminal parts 4D and 4E for signal transmission have the same shape and dimensions but different in dimensions from the other three terminal parts 4A to 4C (see FIG. 7). Therefore, hereinafter, explanation of detail configuration is given to only the terminal part 4A for power supply.

Figure 6:
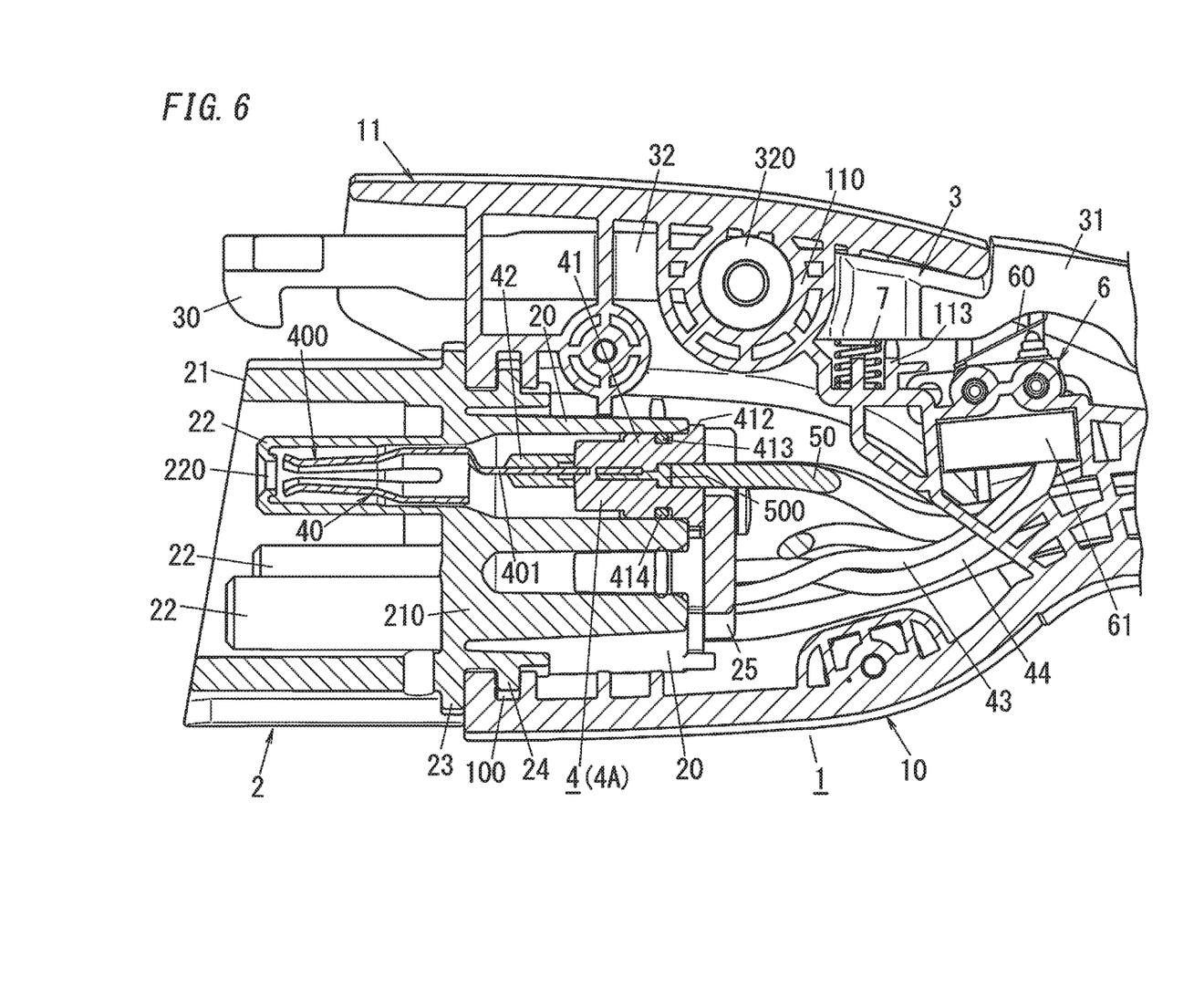
FIG. 6 is a partial section of the charging connector of the present embodiment.

As shown in FIG. 7, the terminal part 4 includes a receiver contact 40 of metal, a first molded part 41, and a second molded part 42. The receiver contact 40 includes, as shown in FIG. 5 and FIG. 6, a blade receiver 400 and a terminal piece 401.

The blade receiver 400 includes, as shown in FIG. 7, four blade receiving springs 402 and is configured to hold a bar-shaped contact between the blade receiving springs 402. The terminal piece 401 is formed in a narrow rectangular flat plate shape, and protrudes rearward from a rear end of the blade receiver 400. A conductor 500 of the power supply wire 50 is fixed to the terminal piece 401 (e.g., by soldering) (see FIG. 6).

The first molded part 41 includes a main part 410 with a hollow cylindrical shape, a rectangular prism part 411 protruding from a front end of the main part 410, and a flange part 412 with a circular ring shape protruding in the upward, downward, left and right directions from a rear end of the main part 410. The first molded part 41 is molded around the terminal piece 401 and the power supply wire 50 as inserts from a synthetic resin material such as polybutylene terephthalate (PBT) resin. Further, there is a groove 413 extending along a circumferential direction in an outer peripheral surface of the main part 410. There is a sealing member with a circular ring shape (so-called O-ring) 414 inserted into the groove 413 (see FIG. 6 and FIG. 7).

The second molded part 42 is formed, by hot melt molding, in a rectangular prism shape to cover the terminal piece 401 protruding from the rectangular prism part 411 of the first molded part 41.

The terminal part 4 is inserted into the holding part 20 and the protective wall 22 from the rear side of the holding part 20 until the flange part 412 of the first molded part 41 comes into contact with the rear end of the holding part 20 (see FIG. 6). Thus, the blade receiver 400 is accommodated in the protective wall 22 and the first molded part 41 and the second molded part 42 are accommodated in the holding part 20. Additionally, a pressing plate 25 is screwed to the rear end of the holding part 20 (see FIG. 6). Hence, the flange parts 412 of the first molded parts 41 are sandwiched between the rear ends of the holding parts 20 and the pressing plate 25, and thereby the terminal parts 4 are prevented from being detached from the holding parts 20. Note that, the protective wall 22 includes a hole 220 penetrating through a front wall thereof, and a contact of a charging inlet is inserted into the protective wall 22 via the hole 220.

The lever 3 includes the latch 30, a manual operating part 31, and an interconnecting part 32 which are formed integrally as a synthetic resin molded product (see FIG. 5). The latch 30 is formed in a sector shape with a central angle of 90 degrees. The manual operating part 31 is formed in a box shape with a rear end surface which is a half cylindrical surface (see FIG. 3 and FIG. 5). Note that, there is a through hole 310 penetrating through a rear end part of the manual operating part 31 in the left and right direction. The interconnecting part 32 is formed in a thin and long bar shape, and is provided at its front end with the latch 30 and at its rear end with the manual operating part 31. In summary, the latch 30 and the manual operating part 31 are interconnected by the interconnecting part 32.

Additionally, the interconnecting part 32 includes an axle part 320 with a hollow cylindrical shape at a center thereof in the forward and rearward direction. The axle part 320 protrudes more outward than the remaining part of the interconnecting part 32 in the left and right direction and is supported in a rotatable (swingable) manner by axle bearing parts 110 provided inside the second accommodation part 11 formed by the first half body 1A and the second half body 1B (see FIG. 5).

The second accommodation part 11 slightly protrudes forward from the first accommodation part 10 and has an open front surface. A front end part of the lever 3 including the latch 30 protrudes forward through an opening 111 in the front of the second accommodation part 11 (see FIG. 5). Additionally, there is an insertion hole 112 provided in a rear end part of the second accommodation part 11 so as to allow insertion of the manual operating part 31. In other words, the manual operating part 31 protrudes outside the second accommodation part 11 through the insertion hole 112 (see FIG. 1 and FIG. 5).

Further, there is a spring holding part 113 provided inside the second accommodation part 11 so as to be in back of the axle bearing part 110 (see FIG. 6). The spring holding part 113 holds a lower end of the coil spring 7. In contrast, the interconnecting part 32 includes a spring receiving part 321 in back of the axle part 320. This spring receiving part 321 is a hollow cylindrical recess which opens downward. An upper end of the coil spring 7 is fitted into the spring receiving part 321, and thereby the coil spring 7 is held between the spring holding part 113 and the spring receiving part 321 of the interconnecting part 32 while compressed. Thus, the lever 3 is accommodated in the second accommodation part 11 while the coil spring 7 gives spring force to the lever 3 in a direction that the manual operating part 31 protrudes outside via the insertion hole 112 (that is, a counterclockwise direction in FIG. 5).

Further, there is a detection switch 6 placed inside the second accommodation part 11 to be in back of the spring holding part 113. The detection switch 6 is a microswitch and includes a case accommodating a contact mechanism and a manual operating piece 60 supported by the case in a swingable manner. The detection switch 6 has a common terminal to be connected to an electric wire 43 to be connected to the terminal part 4C for grounding, and a normally closed terminal connected to an electric wire 44 to be connected to the terminal part 4D for signal transmission. The detection switch 6 is configured to switch the contact mechanism inside the case to break an electric circuit between the two electric wires 43 and 44 in response to manual operation of the manual operating piece 60. Note that, the manual operating piece 60 has an end part in contact with the manual operating part 31 of the lever 3, and therefore the end part can be pressed via the manual operating part 31 (see FIG. 5).

Hereinafter, it is described how to assemble the charging connector of the present embodiment.

First, each of the conductors 500 of the power supply wires 50, the conductor of the grounding wire 52, and the conductor of the signal wire 51 of the charging cable 5 and conductors of the electric wires 43 and 44 is fixed to a corresponding one of the terminal pieces 401 of the receiver contacts 40. Subsequently, the first molded part 41 is formed of a synthetic resin material (PBT resin) around a junction between the terminal piece 401 and the conductor 500 (which means any of the conductor 500 and the conductors of the signal wire 51, the grounding wire 52, and the electric wires 43 and 44, this term is used in the same meaning in the following description). Thereafter, the second molded part 42 is formed of a different synthetic resin material (polyester resin) around a border between the first molded part 41 and the terminal piece 401 by hot melt molding. Note that, the electric wires 43 and 44 are preliminarily soldered to the common terminal and the normally closed terminal of the detection switch 6, respectively.

A worker who conducts assembly (assembler) individually inserts the terminal parts 4 into the holding parts 20 of the cover 2 and screws the pressing plate 25 to the rear ends of the holding parts 20. Then, the assembler places the holding parts 20 of the cover 2 inside the first accommodation part 10 of the first half body 1A. Note that, there is a groove 100 provided in an inner peripheral wall of the first accommodation part 10 so as to receive the second flange 24 of the cover 2 (see FIG. 6). The assembler places the holding parts 20 of the cover 2 inside the first accommodation part 10 of the first half body 1A while fitting the second flange 24 of the cover 2 into the groove 100. Additionally, the assembler fixes a holder 61 to the second accommodation part 11.

Subsequently, the assembler places the power supply wires 50, the signal wire 51, and the grounding wire 52 inside the first accommodation part 10 and the grip 12, and draws the charging cable 5 outside via a drawing opening 120 provided at a rear end of the grip 12 (see FIG. 5).

Next, the assembler places the lever 3 inside the second accommodation part 11 so that the axle part 320 is inserted in the axle bearing part 110 of the first half body 1A and the end part including the latch 30 protrudes outside via the opening 111 and the manual operating part 31 passes through the insertion hole 112. Note that, it is preferable that the assembler allows the spring holding part 113 to hold the coil spring 7 in placing the lever 3 inside the second accommodation part 11.

Finally, the assembler places the second half body 1B to cover the first half body 1A and screws the first half body 1A and the second half body 1B to each other to assemble the main body 1. In this manner, the charging connector of the present embodiment is assembled.

Next, how to use the charging connector of the present embodiment is briefly described. First, a worker who intends to perform charging, grasps the grip 12 by hand, and inserts the surrounding wall part 21 of the cover 2 into a charging inlet of an electric vehicle. Thereby, a contact of the charging inlet is inserted into the hole 220 of the protective wall 22 and therefore is connected to the blade receiver 400 of the receiver contact 40. Further, the latch 30 of the lever 3 is engaged with an engaging part provided to an outer case of the charging inlet and thereby the charging connector is prevented from being detached from the charging inlet.

While the latch 30 is engaged with the engaging part, the coil spring 7 provides spring force so as to press the lever 3 in a direction that the manual operating part 31 protrudes outside via the insertion hole 112. Thus, the manual operating part 31 does not press the manual operating piece 60, and consequently the detection switch 6 is turned on.

An electronic control unit (ECU) for charging control installed in the electric vehicle determines that the charging connector is connected to the charging inlet, when an electric circuit is made between the terminal part 4D for signal transmission and the terminal part 4C for grounding. Hence, the ECU outputs a CPLT signal by use of the two terminal parts 4C and 4E and cooperates with the charging facilities to determine a magnitude of a charging current or the like, and thereafter starts charging by allowing the charging facilities to supply power.

Note that, when the manual operating part 31 is pressed, the manual operating piece 60 of the detection switch 6 is also pressed and then the detection switch 6 is turned off. When the detection switch 6 is turned off and the electric circuit between the terminal parts 4C and 4D is broken, the ECU determines that the charging connector is being detached or has been detached from the charging inlet, and thus stops charging. Note that, in charging, it is preferable to prohibit the manual operating part 31 from being pressed, by use of a lock (e.g., padlock) with a latch inserted into the through hole 310 provided to the manual operating part 31.

In this regard, in the charging connector of the present embodiment, the junction between the receiver contact 40 (the terminal piece 401 thereof) and the conductor of the charging cable 5 (e.g., the conductor 500 of the power supply wire 50) is covered with the first molded part 41 which is a synthetic resin molded product. Accordingly, in contrast to a structure where a power supply terminal (corresponds to the receiver contact 40) is exposed as with in the conventional example, excessive stress is not likely to occur at the junction when the charging connector is inserted into or pulled out from the charging inlet. As a result, the charging connector of the present embodiment can suppress a decrease in long-term reliability compared with the conventional example.

As described above, the charging connector of the present embodiment includes the plurality of terminal parts 4, the main body 1, and the cover 2. Each of the plurality of terminal parts 4 includes the receiver contact 40 to be electrically connected to the conductor 500 of the charging cable 5, and the first molded part 41 for covering the junction between the receiver contact 40 and the conductor 500. Further, each of the plurality of terminal parts 4 includes the sealing member with a ring shape (the O-ring 414) for circumferentially surrounding the outer peripheral surface of the first molded part 41, and the second molded part 42 for covering the border between the receiver contact 40 and the first molded part 41. The cover 2 includes the plurality of holding parts 20 individually holding the plurality of terminal parts 4, and the surrounding wall part 21 surrounding the receiver contacts 40 individually protruding from the plurality of holding parts 20. The main body 1 includes the accommodating part (the first accommodation part 10) accommodating the plurality of holding parts 20, and the grip 12 for accommodating the end part of the charging cable 5. Each first molded part 41 and each second molded part 42 are a molded product of a first synthetic resin material and a molded product of a second synthetic resin material, respectively. The first synthetic resin material forming each first molded part 41 is a synthetic resin material having a higher creep resistance than the second synthetic resin material forming each second molded part 42. The second synthetic resin material forming each second molded part 42 is a synthetic resin material higher than the first synthetic resin material forming each first molded part 41 in adhesion to a material forming each receiver contact 40.

The charging connector of the present embodiment is configured as above, and the sealing member (the O-ring 414) fills up a gap between the inner peripheral surface of the holding part 20 and the first molded part 41, and therefore it is possible to suppress intrusion of water (e.g., rain water) into an inside of the main body 1. Additionally, the sealing member (the O-ring 414) always applies its resilient force to the first molded part 41, and hence it is preferable that the first molded part 41 be made of a synthetic resin material excellent in a creep resistance such as PBT resin. However, the adhesion of PBT to material forming the receiver contact 40 (e.g., copper or a copper alloy) is not so high, and thus a fine gap is likely to occur between the first molded part 41 and the receiver contact 40.

In consideration of this, it is preferable that the second molded part 42 be made of a synthetic resin material (e.g., polyester resin) which is higher than PBT resin in adhesion to the material forming the receiver contact 40. In this case, it is possible to suppress intrusion of water (e.g., rain water) through a fine gap which is likely to occur between the first molded part 41 and the receiver contact 40. In conclusion, the charging connector of the present embodiment can suppress a decrease in long-term reliability. Note that, PBT resin and polyester resin are merely examples, and other synthetic resin materials can be used for forming the first molded part 41 and the second molded part 42.

Additionally, it is preferable that the receiver contact 40 include the terminal piece 401, and the first molded part 41 cover the junction between the terminal piece 401 and the conductor 500, and the second molded part 42 cover the terminal piece 401 protruding from the first molded part 41.

The invention claimed is:
1. A charging connector, comprising:
a plurality of terminal parts;
a main body; and
a cover,
each of the plurality of terminal parts including
a receiver contact to be electrically connected to a conductor of a charging cable,
a first molded part for covering a junction between the receiver contact and the conductor,
a sealing member with a ring shape for circumferentially surrounding an outer peripheral surface of the first molded part, and
a second molded part for covering a border between the receiver contact and the first molded part,
the cover including
a plurality of holding parts individually holding the plurality of terminal parts, and
a surrounding wall part surrounding the receiver contacts individually protruding from the plurality of holding parts,
the main body including
an accommodating part accommodating the plurality of holding parts, and
a grip for accommodating an end part of the charging cable,
each first molded part and each second molded part being
a molded product of a first synthetic resin material and a molded product of a second synthetic resin material, respectively,
the first synthetic resin material forming each first molded part being a synthetic resin material having a higher creep resistance than the second synthetic resin material forming each second molded part, and the second synthetic resin material forming each second molded part being a synthetic resin material higher than the first synthetic resin material forming each first molded part in adhesion to material forming each receiver contact.

2. The charging connector of claim 1, wherein:

each receiver contact includes a terminal piece;

each first molded part is for covering a junction between the terminal piece of the receiver contact and the conductor; and each second molded part is for covering the terminal piece protruding from the first molded part.

\* \* \* \* \*